United States Patent
Kern (10) Patent No.: US 8,458,013 B2
(45) Date of Patent: Jun. 4, 2013

(54) TEST PORTFOLIO OPTIMIZATION SYSTEM

(75) Inventor: Daniel C. Kern, Charlotte, NC (US)

(73) Assignee: Bank of America Corporation, Charlotte, NC (US)

(*) Notice: Subject to any disclaimer, the term of this patent is extended or adjusted under 35 U.S.C. 154(b) by 20 days.

(21) Appl. No.: 13/085,116

(22) Filed: Apr. 12, 2011

(65) Prior Publication Data

US 2012/0265566 A1 Oct. 18, 2012

(51) Int. Cl.
*G06Q 10/00* (2006.01)

(52) U.S. Cl.
USPC ........ 705/7.38; 705/7.11; 705/7.39; 705/7.41

(58) Field of Classification Search
USPC ........................................................ 705/7.38
See application file for complete search history.

(56) References Cited

U.S. PATENT DOCUMENTS

| | | | | |
|---|---|---|---|---|
| 5,930,762 A * | 7/1999 | Masch | ......................... | 705/7.28 |
| 5,954,516 A * | 9/1999 | Heinberg | ....................... | 434/322 |
| 6,167,545 A * | 12/2000 | Statovici et al. | .............. | 714/724 |
| 6,367,041 B1 * | 4/2002 | Statovici et al. | .............. | 714/724 |
| 6,907,378 B2 | 6/2005 | Stirrat et al. | | |
| 6,928,418 B2 * | 8/2005 | Michaud et al. | ............ | 705/36 R |
| 6,970,831 B1 * | 11/2005 | Anderson et al. | ............ | 705/7.32 |
| 7,729,891 B2 | 6/2010 | Fine et al. | | |
| 7,778,897 B1 * | 8/2010 | Rachev et al. | .................. | 705/35 |
| 8,170,893 B1 * | 5/2012 | Rossi | ........................... | 705/7.11 |
| 2003/0125609 A1 * | 7/2003 | Becker | ........................ | 600/300 |
| 2004/0083150 A1 * | 4/2004 | Michaud et al. | ............... | 705/36 |
| 2004/0260566 A1 * | 12/2004 | King | .................................. | 705/1 |
| 2006/0129441 A1 * | 6/2006 | Yankovich et al. | ............... | 705/8 |
| 2008/0281742 A1 * | 11/2008 | Lyons et al. | .................... | 705/35 |
| 2009/0037258 A1 * | 2/2009 | Lyons et al. | .................... | 705/10 |
| 2009/0125270 A1 | 5/2009 | O'Shea et al. | | |
| 2009/0182609 A1 * | 7/2009 | Kelleher | .......................... | 705/9 |
| 2010/0121783 A1 * | 5/2010 | Lyons et al. | ................ | 705/36 R |
| 2010/0250318 A1 * | 9/2010 | Paramoure et al. | ............... | 705/8 |

OTHER PUBLICATIONS

Singpurwalla, Nozer D.; "Determining an Optimal Time Interval for Testing and Debugging Software"; Apr. 1991; IEEE Transactions on Software Engineering; vol. 17, No. 4, pp. 313-319.*

* cited by examiner

*Primary Examiner* — Leland Marcus
(74) *Attorney, Agent, or Firm* — Michael Springs (57) ABSTRACT

According to one example, a test portfolio optimization system includes a test repository, an activity repository, an exception repository, and an optimization engine. The optimization engine is operable to generate a plurality of test portfolios. Each test portfolio comprises different types of tests of a plurality of tests. The optimization engine is also operable to determine a test cost for each portfolio over the period of time. The test cost for each portfolio is equal to a sum of costs for each test type within the portfolio over the period of time. The optimization engine is also operable to determine an impact per portfolio period of time. The impact per portfolio is equal to a sum of impacts per test type for each test type over the period of time.

20 Claims, 3 Drawing Sheets

FIG. 1

TABLE
200

| TEST PORTFOLIO | FIRST TEST 112 | SECOND TEST 114 | THIRD TEST 116 |
|---|---|---|---|
| FIRST TEST PORTFOLIO 142 | SEMI ANNUAL 100 142a | SEMI ANNUAL 500 142b | MONTHLY 20 142c |
| SECOND TEST PORTFOLIO 144 | QUARTERLY 50 144a | SEMI ANNUAL 250 144b | MONTHLY 20 144c |
| THIRD TEST PORTFOLIO 146 | SEMI ANNUAL 10 146a | QUARTERLY 250 146b | MONTHLY 10 146c |

TEST PORTFOLIO OPTIMIZATION SYSTEM

TECHNICAL FIELD

The present disclosure relates to tests of enterprise activities and more specifically to a test portfolio optimization system.

BACKGROUND

A regulated market is the provision of goods or services that is regulated by a government or a government-appointed body. For example, a regulation may cover the terms and conditions of supplying goods and services, such as the price allowed to be charged and/or whom they are distributed. A variety of forms of regulations exist in a regulated market. These include controls, oversights, anti-discrimination, environmental protection, taxation, and labor laws.

SUMMARY

According to one embodiment, a test portfolio optimization system comprises a test repository, an activity repository, an exception repository, and an optimization engine. The test repository is operable to identify a plurality of tests associated with one or more policies that guide a enterprise's performance of a activity. Each test comprises at least one test question that assesses the enterprise's adherence to the policy. The activity repository is operable to identify an activity volume. The activity volume represents a number of times the enterprise performs the activity. The exception repository is operable to identify an impact per exception. An exception is an event in which the enterprise's performance of the activity fails to adhere to the policy. The impact per exception is a number characterizing how one exception impacts the enterprise.

According to one embodiment, the optimization engine is operable to generate a plurality of test portfolios. Each test portfolio comprises different types of tests of the plurality of tests. Each test type is characterized by a sample size and a frequency. The frequency represents a number of times the test type is to be administered during a period of time. The optimization engine is also operable to determine a test cost for each portfolio over the period of time. The test cost for each portfolio is equal to a sum of costs for each test type within the portfolio over the period of time. The cost for each test type over the period of time is based on the sample size, the frequency of the test type, and the cost to perform the test on each sample. The optimization engine is also operable to determine an expected impact per portfolio for the period of time. The impact per portfolio represents an ability to reduce impact on the enterprise by identifying exceptions. The impact per portfolio is equal to a sum of impacts per test type for each test type over the period of time. The impact per test type over the period of time is based on the activity volume, the impact per exception, and an historical impact rate.

Certain embodiments may provide one or more technical advantages. A technical advantage of one embodiment may include the capability to select samples from a volume of activities performed by the enterprise and test the samples to determine whether its policies are being followed. A technical advantage of one embodiment may also include the capability to improve test efficiency by measuring both the benefits and costs associated with changes in frequency and sample size. A technical advantage of one embodiment may also include the capability to prioritize tests within a portfolio by comparing the benefits and costs associated with the tests.

Various embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure and its advantages, reference is now made to the following description taken in conjunction with the accompanying drawings, in which.

DETAILED DESCRIPTION

It should be understood at the outset that, although example implementations of embodiments of the invention are illustrated below, the present invention may be implemented using any number of techniques, whether currently known or not. The present invention should in no way be limited to the example implementations, drawings, and techniques illustrated below. Additionally, the drawings are not necessarily drawn to scale.

An enterprise may include any individual, business, or organization. One example of an enterprise may include a financial enterprise. A financial enterprise may include any individual, business, or organization that engages in financial activities, which may include, but are not limited to, banking and investment activities such as maintaining accounts (e.g., transaction accounts, savings accounts, credit accounts, investment accounts, insurance accounts, portfolios, etc.), receiving deposits, crediting accounts, debiting accounts, extending credit to account holders, purchasing securities, providing insurance, and supervising a customer's portfolio.

A financial enterprise is subject to various regulations. A financial enterprise may promulgate policies in response to these regulations. A policy is a principle or rule to guide decisions. A financial enterprise may promulgate policies to guide employees of the financial enterprise in complying with the regulations. For example, if a government regulation prohibits certain types of short-sales, the financial enterprise may promulgate a policy instructing its employees not to execute the prohibited short-sales.

Policies are not limited to guides promulgated in response to a government regulation. As another example, a financial enterprise may promulgate a policy instructing its employees to have any cosigner on a loan sign the loan agreement. In this example, the policy is not compelled by government regulation, but rather by what the financial entity believes to be sound business practice.

Failure to comply with policies may have consequences for the financial enterprise. For example, in the cosigner example from the preceding paragraph, each failure to obtain a signature from a cosigner may expose the financial enterprise to financial costs (e.g., the cosigner who does not sign the loan may no longer be liable for the loan), time costs (e.g., the amount of time necessary to track down the cosigner and obtain the signature), goodwill costs (e.g., the cosigner may be less willing to do business with the financial enterprise again), and/or civil penalty costs (e.g., there may be a fine for failure to comply with regulations). If the financial enterprise regularly fails to obtain signatures from cosigners, the overall impact on the financial enterprise increases.

A financial enterprise may desire to test whether its policies are being followed. Teachings of certain embodiments recognize the ability to select samples from a volume of activities performed by the financial enterprise and test the samples to determine whether its policies are being followed. Teachings of certain embodiments also recognize that testing samples may allow the financial enterprise to identify policies that are not being followed and to take corrective action. To this end, testing may reduce the overall impact on the financial enterprise due to failure to comply with policies.

Teachings of certain embodiments also recognize that quickly identifying failures to follow policies may reduce the overall impact on the financial enterprise by correcting the issues causing failures more quickly. For example, if employees of a financial enterprise stop complying with a policy due to a change in company software, quickly correcting the company software may reduce the number of failures. To this end, teachings of certain embodiments recognize that increasing the frequency of testing may reduce the overall impact of failures on the financial enterprise. For example, monthly testing may result in a greater reduction of the overall impact of failures on the financial enterprise as compared to quarterly testing or yearly testing.

Teachings of certain embodiments also recognize that increasing the sample size per test may reduce the overall impact on the financial enterprise due to failure to comply with policies. Returning to the cosigner example, if the financial enterprise processes one million loans per month, the financial enterprise may desire to test selected samples from the one million loans to assess whether the financial enterprise is adhering to its policies. For example, the financial enterprise may select one-hundred samples from the one million loans to review. However, in some scenarios, more precision may be desired. Teachings of certain embodiments recognize that increasing the sample size also increases the precision.

For example, testing two hundred samples will yield more precise results than testing only one-hundred samples. Reviewing those two hundred samples, however, may take additional time and other resources. At some point, the cost of testing may exceed the benefits of testing. Accordingly, teachings of certain embodiments recognize the capability to improve test efficiency by measuring both the benefits and costs associated with changes in frequency and sample size.

In addition, a financial enterprise may conduct a variety of activities and may have several policies for testing. Teachings of certain embodiments recognize the capability to prioritize tests by comparing the benefits and costs associated with each test.

Figure 1:
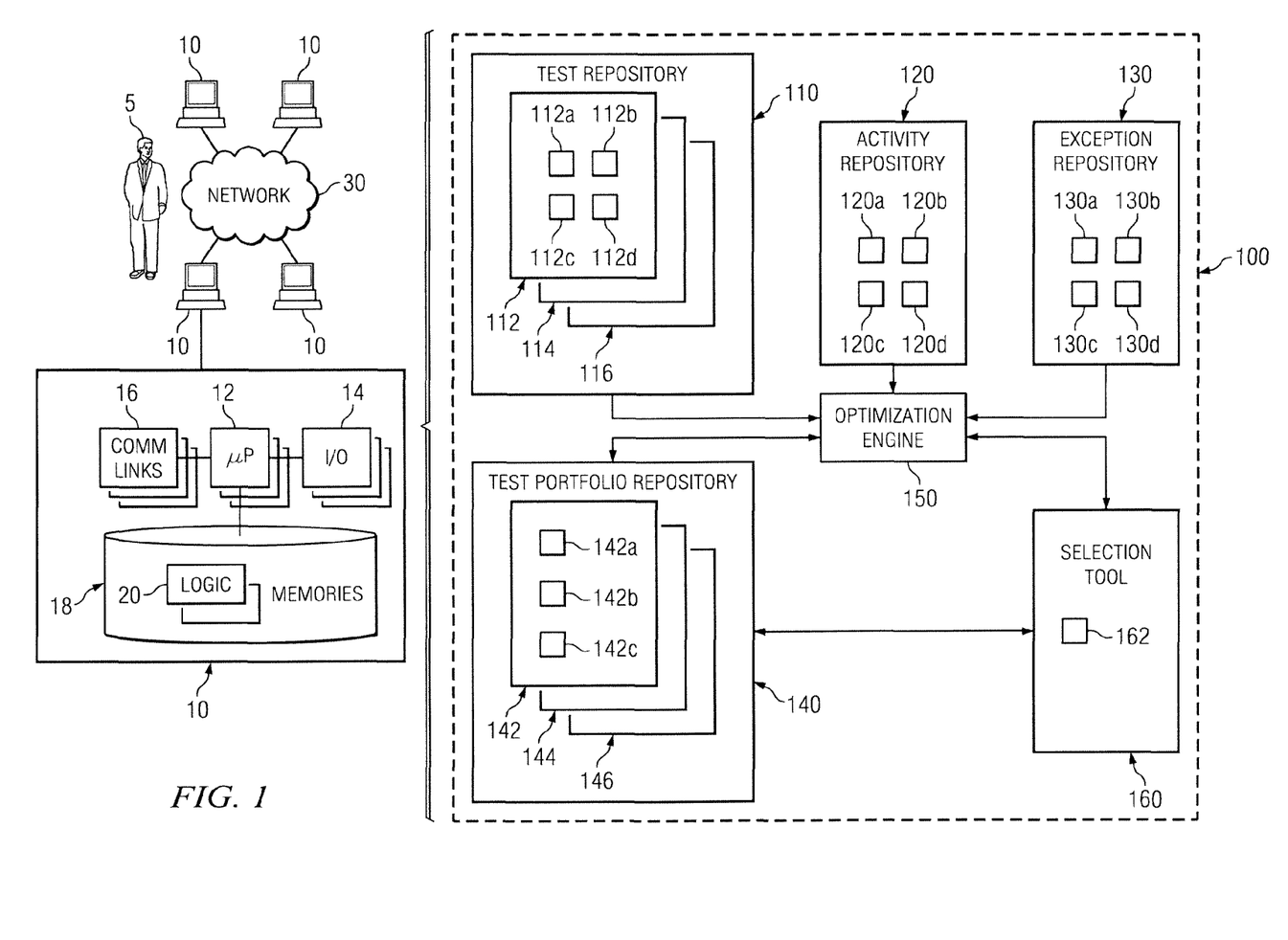
FIG. 1 shows a test portfolio optimization 100 according to one embodiment.

FIG. 1 shows a test portfolio optimization system 100 according to one embodiment. The test portfolio optimization system 100 of FIG. 1 features a test repository 110, an activity repository 120, an exception repository 130, a test portfolio repository 140, an optimization engine 150, and a selection tool 160, that may be implemented by one or more computer systems 10.

Users 5 may access test portfolio optimization system 100 through computer systems 10. For example, in some embodiments, users 5 may provide information to test repository 110, activity repository 120, and/or exception repository 130. As another example, in some embodiments, user 5 may interact with optimization engine 150 and/or selection tool 160.

Users 5 may include any individual, group of individuals, entity, machine, and/or mechanism that interacts with computer systems 10. Examples of users 5 include, but are not limited to, a manager, executive, review board, accountant, engineer, technician, contractor, agent, and/or employee. Users 5 may be associated with an organization. An organization may include any social arrangement that pursues collective goals. One example of an organization is a business. A business is an organization designed to provide goods or services, or both, to consumers, governmental entities, and/or other businesses. Examples of a business may include, but are not limited to, financial enterprises, agriculture and mining businesses, manufacturers, real estate companies, retailers and distributors, service businesses, transportation companies, and utility companies. A business may include both for-profit and not-for-profit businesses. An organization may also include multiple businesses. For example, an organization may control businesses in multiple jurisdictions throughout the world. Examples of organizations are not limited to businesses. For example, an organization can itself be a government entity. In one example embodiment, test portfolio optimization system 100 is associated with a financial enterprise, and user 5 is an employee or representative of the financial enterprise.

Computer system 10 may include processors 12, input/output devices 14, communications links 16, and memory 18. In other embodiments, computer system 10 may include more, less, or other components. Computer system 10 may be operable to perform one or more operations of various embodiments. Although the embodiment shown provides one example of computer system 10 that may be used with other embodiments, such other embodiments may utilize computers other than computer system 10. Additionally, embodiments may also employ multiple computer systems 10 or other computers networked together in one or more public and/or private computer networks, such as one or more networks 30.

Processors 12 represent devices operable to execute logic contained within a medium. Examples of processor 12 include one or more microprocessors, one or more applications, and/or other logic. Computer system 10 may include one or multiple processors 12.

Input/output devices 14 may include any device or interface operable to enable communication between computer system 10 and external components, including communication with a user or another system. Example input/output devices 14 may include, but are not limited to, a mouse, keyboard, display, and printer.

Network interfaces 16 are operable to facilitate communication between computer system 10 and another element of a network, such as other computer systems 10. Network interfaces 16 may connect to any number and combination of wireline and/or wireless networks suitable for data transmission, including transmission of communications. Network interfaces 16 may, for example, communicate audio and/or video signals, messages, internet protocol packets, frame relay frames, asynchronous transfer mode cells, and/or other suitable data between network addresses. Network interfaces 16 connect to a computer network or a variety of other communicative platforms including, but not limited to, a public switched telephone network (PSTN); a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable network interfaces; or any combination of the preceding.

Memory 18 represents any suitable storage mechanism and may store any data for use by computer system 10. Memory 18 may comprise one or more tangible, computer-readable, and/or computer-executable storage medium. Examples of memory 18 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

In some embodiments, memory 18 stores logic 20. Logic 20 facilitates operation of computer system 10. Logic 20 may include hardware, software, and/or other logic. Logic 20 may be encoded in one or more tangible, non-transitory media and may perform operations when executed by a computer. Logic 20 may include a computer program, software, computer executable instructions, and/or instructions capable of being executed by computer system 10. Example logic 20 may include any of the well-known OS2, UNIX, Mac-OS, Linux, and Windows Operating Systems or other operating systems. In particular embodiments, the operations of the embodiments may be performed by one or more computer readable media storing, embodied with, and/or encoded with a computer program and/or having a stored and/or an encoded computer program. Logic 20 may also be embedded within any other suitable medium without departing from the scope of the invention.

Various communications between computers 10 or components of computers 10 may occur across a network, such as network 30. Network 30 may represent any number and combination of wireline and/or wireless networks suitable for data transmission. Network 30 may, for example, communicate internet protocol packets, frame relay frames, asynchronous transfer mode cells, and/or other suitable data between network addresses. Network 30 may include a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable communication links; or any combination of the preceding. Although the illustrated embodiment shows one network 30, teachings of certain embodiments recognize that more or fewer networks may be used and that not all elements may communicate via a network. Teachings of certain embodiments also recognize that communications over a network is one example of a mechanism for communicating between parties, and any suitable mechanism may be used.

Test repository 110 stores tests. A test may include any procedure for assessing a financial enterprise's adherence to a policy. A policy is a principle or rule to guide decisions. In the example of FIG. 1, test repository 110 includes three tests: a first test 112, a second test 114, and a third test 116. Each test may include one or more test questions. For example, in FIG. 1, first test 112 includes four test questions: first test question 112a, second test question 112b, third test question 112c, and fourth test question 114d.

Test questions 112a, 112b, 112c, and 112d may be expressed in any suitable form. For example, in one embodiment, test question 112a presents an exclusive disjunction regarding whether a financial enterprise's performance of an activity adheres to a policy. An exclusive disjunction is a pair of alternatives of which only one is acceptable. Examples of an exclusive disjunction include yes/no pairs and true/false pairs. In the cosigner example described above, test question 112a might resemble the following polar question: "Did the cosigner sign the loan agreement?"

Test repository 110 may also store additional information regarding tests 112, 114, and 116 and/or test questions 112a, 112b, 112c, and 112d. For example, in some embodiments, test repository 110 stores a cost associated with each test and/or test question. In one example, the cost of a test or test question is expressed in terms of the time necessary to administer the test or test question. In another example, the cost is expressed in terms of dollars or points.

Activity repository 120 stores information regarding activities of a financial enterprise. This information may include, but is not limited to, a description of the activity and an activity volume representing a number of times the financial enterprise performs the activity. In the example of FIG. 1, activity repository 120 includes information regarding four activities: first activity 120a, second activity 120b, third activity 120c, and fourth activity 120d. In the cosigner example, first activity 120a may be the act of granting a loan with a cosigner or the act of filling out a cosigner form. In this example, first test 112a tests whether a financial enterprise's performance of first activity 120a complies with the relevant policy.

Exception repository 130 stores information regarding exceptions. An exception is an event in which the financial enterprise's performance of the activity fails to adhere to the policy. In the example of FIG. 1, exception repository 130 includes information regarding four exceptions: first exception 130a, second exception 130b, third exception 130c, and fourth exception 130d. In the cosigner example, first exception 130a may be failing to have the cosigner sign the loan agreement, and exception repository 130 may store information identifying the impact of failing to obtain the cosigner's signature. In this example, first test 112a reviews first activities 120a to identify exceptions 130a.

The information stored in exception repository 130 may include information identifying an impact per exception which characterizes how one exception impacts the financial enterprise. This information may be expressed in any suitable format. In one embodiment, impact per exception information is expressed in dollars to represent the financial impact on the financial enterprise. In another embodiment, impact per exception information is expressed as part of a point system. The impact per exception may be based on a variety of factors, including financial costs (e.g., the cosigner who does not sign the loan may no longer liable for the loan), time costs (e.g., the amount of time necessary to track down the cosigner and obtain the signature), goodwill costs (e.g., the cosigner may be less willing to do business with the financial enterprise again), and/or civil penalty costs (e.g., there may be a fine for failure to comply with regulations).

Test portfolio repository 140 stores test portfolios. A test portfolio is a collection of one or more test types. Test types are variants of tests, such as tests 112-116. In the example of FIG. 1, test portfolio 140 includes first test portfolio 142, second test portfolio 144, and third test portfolio 146. Each portfolio contains one or more test types. For example, first test portfolio 142 includes first test type 142a, second test type 142b, and third test type 142c. In this example, first test type 142a, second test type 142b, and third test type 142c are variants of tests 112-116.

A test type may be characterized by any suitable variables. In one example embodiment, test types are characterized based on sample size. In the cosigner example, first test 112 tests whether the cosigner on a loan signed the loan agreement. In this example, first test portfolio 142 may have a first test type 142a that represents test 112 set to two-hundred samples per test. Other portfolios may have other test types characterized by different sample sizes. For example, second test portfolio 144 may include a test type that represents test 112 set to one-hundred samples per test.

In another example embodiment, test types are characterized based on frequency. The frequency may represent a number of times the test type is to be administered during a period of time. In the cosigner example, first test portfolio 142 may have a first test type 142a that represents test 112 set to testing every month. Other portfolios may have other test types characterized by different frequencies. For example, second test portfolio 144 may include a test type that represents test 112 set to testing every quarter.

Optimization engine 150 generates test portfolios 142-146 for storage in test portfolio repository 140. In some embodiments, optimization engine also evaluates test portfolios 142-146. For example, in one embodiment, optimization engine 150 determines the cost and impact associated with each portfolio over a period of time, such as one year. The cost of a portfolio represents the resources necessary for the financial enterprise to administer the tests within the test portfolio. In one embodiment, this cost may be expressed in the number of hours required to administer the test portfolio. The cost of a portfolio may be equal to the sum of the costs for each test type within the portfolio. The cost for each test type, in turn, may be based on the sample size, cost to test each sample, and the frequency for each test type. For example, if first test type 142a is to be administered monthly to two-hundred samples, and testing each sample requires five minutes, then the yearly cost in hours to administer test type 142a is two-hundred hours.

The impact of a portfolio represents the portfolio's ability to reduce impact on the financial enterprise by identifying exceptions. As explained above, each exception may negatively impact the financial enterprise, due to factors such as financial costs, time costs, goodwill costs, and/or civil penalty costs. Teachings of certain embodiments recognize that testing may reduce exceptions and therefore reduce costs to the financial enterprise. Optimization engine 150 may measure a portfolio's ability to reduce impact on the financial enterprise by measuring how well and how fast the portfolio identifies exceptions.

Selection tool 160 selects one or more portfolios from test portfolio repository 140 based on information determined by optimization engine 150. As explained above, each portfolio may be associated with a cost and an impact. Selection tool 160 may select a portfolio based on the portfolio's value (e.g., how well the portfolio reduces impact on the financial enterprise for the cost). In one example embodiment, selection tool 160 may comprise logic and/or hardware configured to select one or more portfolios from the portfolios. In another example embodiment, selection tool 160 may comprise logic and/or hardware configured to present information to user 5 such that user 5 may select a portfolio. For example, in one embodiment, selection tool 160 may present a chart or graph to user 5. In some embodiments, selection tool 160 is also configured to receive the selection from user 5.

In the example of FIG. 1, selection tool 160 comprises available resources data 162. Available resources data 162 may represent resources available for testing. In one example embodiment, available resources data 162 defines the maximum number of reviewing hours available. In this example, selection tool 162 may use the available resources data 162 to select the portfolio that has the lowest impact and also satisfies the maximum reviewing hours requirement.

In operation, according to one embodiment, test repository 110 identifies tests 112, 114, and 116. Each test includes one or more questions. For example, test 112 includes test questions 112a-112d. Activity repository 120 identifies activity data for the first activity 120a, 120b, 120c, and 120d. Exception repository 130 identifies an impact per exception for exceptions 130a, 130b, 130c, and 130d. In this example, test question 112a presents an exclusive disjunction regarding a sample of activity 120a to identify whether an exception 130a exists.

Optimization engine 150 generates test portfolios 142, 144, and 146 to be stored in test portfolio repository 140. Each test portfolio includes one or more test types corresponding to tests 112, 114, and 116. For example, test portfolio 142 includes test types 142a, 142b, and 142c. In this example, test type 142a is a variant of test 112 and is characterized by frequency and sample size. Optimization engine 150 determines a cost for portfolios 142, 144, and 146, such as by determining the number of hours necessary to administer portfolios 142, 144, and 146. Optimization engine 150 also determines an impact per portfolio for portfolios 142, 144, and 146. Selection tool 160 selects a portfolio based on the time cost and the impact per portfolio.

Figure 2A:
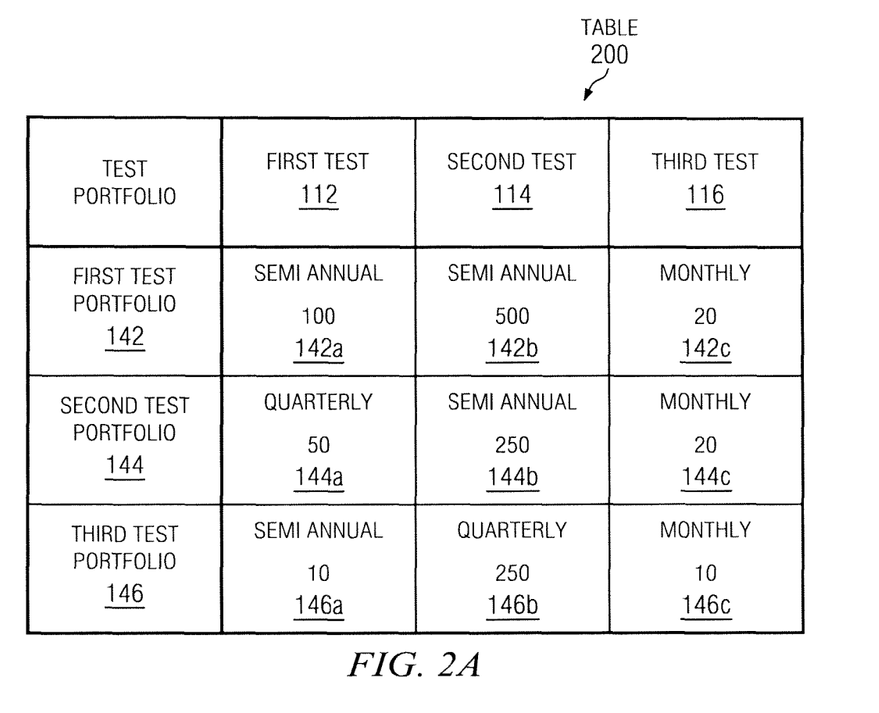
FIG. 2A shows an example table of test portfolios according to one embodiment.

FIG. 2A shows an example table 200 of test portfolios according to one embodiment. In this example, FIG. 2A shows first test portfolio 142, second test portfolio 144, and third test portfolio 146. Each test portfolio has variants of the first test 112, second test 114, and third test 116. Thus, first test portfolio 142 includes first test type 142a, which is a variant of first test 112, second test type 142b, which is a variant of second test 114, and third test type 142c, which is a variant of third test 116. Similarly, second test portfolio 144 includes first test type 144a, which is a variant of first test 112, second test type 144b, which is a variant of second test 114, and third test type 144c, which is a variant of third test 116. In addition, third test portfolio 146 includes first test type 146a, which is a variant of first test 112, second test type 146b, which is a variant of second test 114, and third test type 146c, which is a variant of third test 116. In the example of FIG. 2A, each test type is characterized by its frequency (e.g., monthly, quarterly, or semiannual) and its sample size (ranging from 10 to 500 in the example table 200).

Figure 2B:
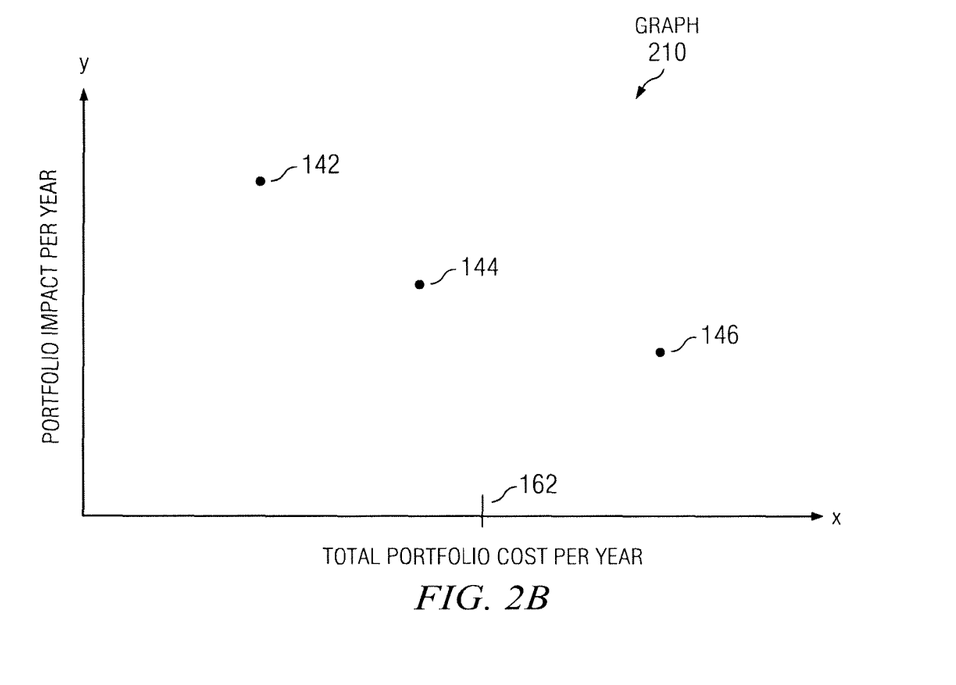
FIG. 2B shows an example graph of test portfolios according to one embodiment.

FIG. 2B shows an example graph 210 of test portfolios according to one embodiment. In this example, graph 210 plots points representative of first test portfolio 142, second test portfolio 144, and third test portfolio 146. The x-axis of graph 210 represents the total cost to administer each portfolio over one year. The y-axis of graph 210 represents the yearly impact for each portfolio. In this example, points lower on the y-axis represent portfolios with a greater ability to reduce the overall impact on the financial enterprise due to failures to comply with policies, whereas points higher on the y-axis represent portfolios that are not as good at reducing impact on the financial enterprise due to failures to comply with policies.

In one example embodiment, selection tool 160 generates graph 210 and presents graph 210 for user 5 to use when selecting an appropriate portfolio. In another example embodiment, graph 210 also plots a marker for the available resources data 162 along the x-axis. Teachings of certain embodiments recognize that plotting the available resources data 162 on graph 210 may assist user 5 in selecting an appropriate portfolio. For example, user 5 may select second test portfolio 144 because, as shown in graph 210, second test portfolio 144 has the lowest impact per year with a cost less than the available resources data 162.

Figure 3A:
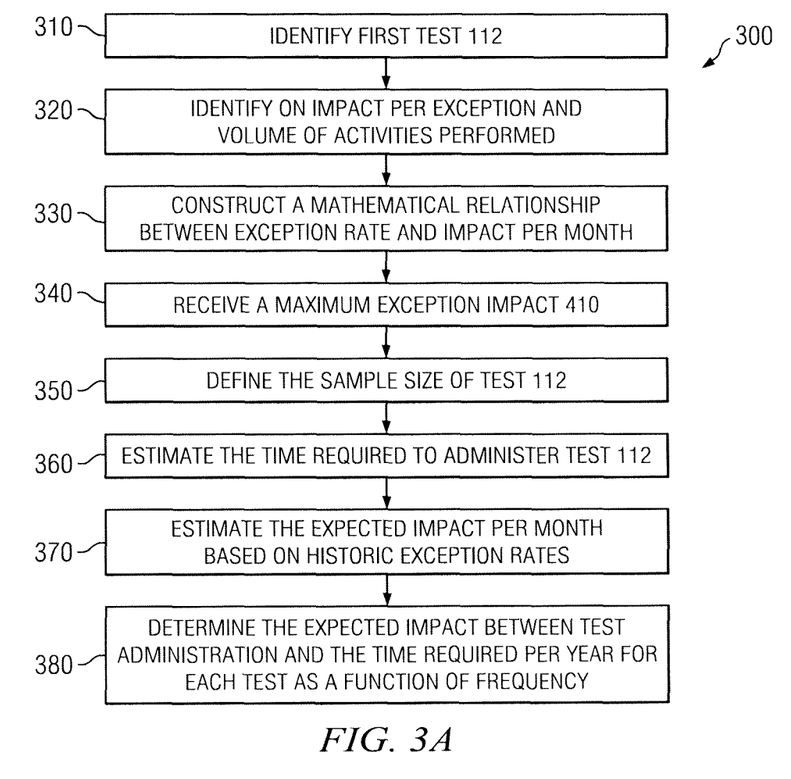
FIG. 3A shows a method for determining the expected impact accumulated between tests and hours required to administer a test over the course of a year as a function of sample size and frequency according to one embodiment.
Figure 3B:
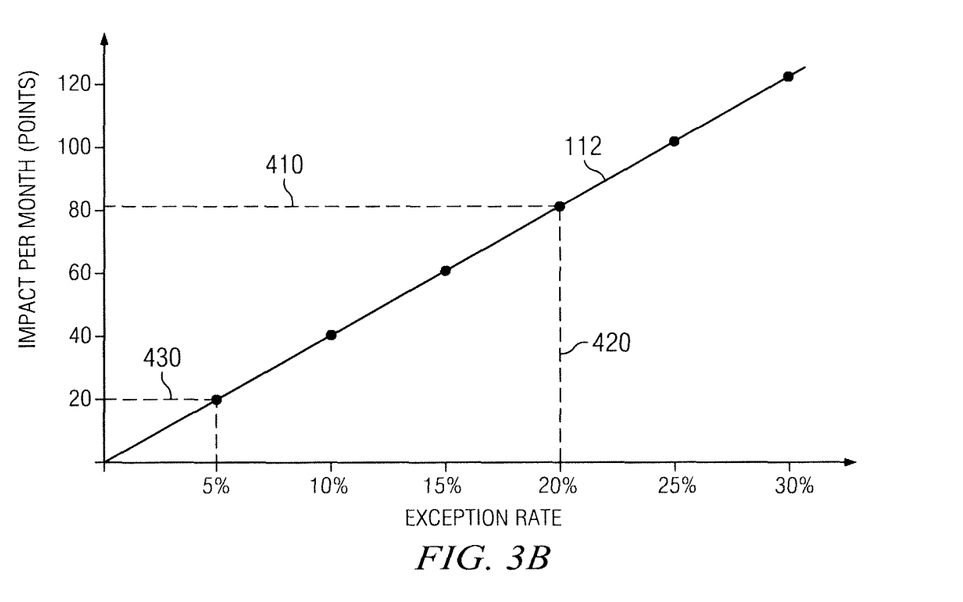
FIG. 3B shows an example graph of a mathematical relationship between impact and exception rate for a test according to one embodiment.

FIG. 3A shows a method 300 for determining the expected impact accumulated between tests and hours required to administer a test over the course of a year as a function of sample size and frequency according to one embodiment. FIG. 3B shows an example graph 400 of a mathematical relationship between impact and exception rate for test 112 according to one embodiment.

At step 310, test 112 is identified. At step 320, the volume of activities 120a and the impact per exception 130a are identified. At step 330, a mathematical relationship between exception rate and impact per month is constructed based on the volume of activities 120a and the impact per exception 130a. This mathematical relationship is graphed in FIG. 3B. In this example, impact per month is equal to impact per exception multiplied by the volume of activities and multiplied by exception rate. Thus, the slope of the line representing test 112 in FIG. 3B is equal to the product of the impact per exception and the volume of activities.

At step 340, a maximum exception impact 410 is received. In graph 400 on FIG. 3B, maximum exception impact 410 represents a maximum allowed impact per month. Teachings of certain embodiments recognize that defining a maximum exception impact may allow a financial enterprise to adjust test parameters to satisfy the financial enterprise's risk appetite. In some embodiments, the financial enterprise defines a maximum exception rate 420, which may then be used to determine the maximum exception impact 410 based on the mathematical relationship between exception rate and impact per month.

At step 350, the sample size of test 112 is defined based on maximum exception impact 410. In this example, the sample size is defined as the number of samples necessary to be tested to keep the maximum impact per month less than maximum exception impact 410. At step 360, the time required to administer the test is estimated based on the sample size determined at step 350. For example, if the sample size determined at step 350 is 240, and administration of one test requires five minutes, then 20 hours are required to administer the test.

At step 370, the expected impact per month 430 is estimated based on historic exception rates. For example, if historically 5% of activities 120a result in exceptions 130a, then the expected impact per month 430 is approximately 20 points.

At step 380, the expected impact between test administrations and the time required per year are determined as a function of frequency. In this example, the expected impact between test administrations is equal to the amount of monthly impact accumulated between each test. For example, if the test is administered quarterly, then the impact accumulated between test administrations is equal to 60 points (expected impact per month of 20 points multiplied by 3 months per quarter), and the time required per year to administer the test quarterly is equal to 80 hours (20 hours per test multiplied by 4 tests per year). In another example, if the test is administered semiannually, then the impact accumulated between test administrations is equal to 120 points, and the time required is equal to 40 hours.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order. Additionally, operations of the systems and apparatuses may be performed using any suitable logic. As used in this document, "each" refers to each member of a set or each member of a subset of a set.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

The invention claimed is:

1. A test portfolio optimization system, comprising:
   a non-transitory medium operable to store:
      information identifying a plurality of tests associated with one or more policies that guide a enterprise's performance of a activity, wherein each test comprises at least one test question that assesses the enterprise's adherence to the policy;
      information identifying an activity volume, wherein the activity volume represents a number of times the enterprise performs the activity; and
      information identifying an impact per exception, wherein an exception is an event in which the enterprise's performance of the activity fails to adhere to the policy, wherein the impact per exception is a number characterizing how one exception impacts the enterprise; and
   an optimization engine comprising a processor communicatively coupled to the non-transitory medium, the optimization engine operable to:
      generate a plurality of test portfolios, each test portfolio comprises different types of tests of the plurality of tests, each test type characterized by a sample size and a frequency, the frequency representing a number of times the test type is to be administered during a period of time;
      determine a test cost for each portfolio over the period of time, the test cost for each portfolio is equal to a sum of costs for each test type within the portfolio over the period of time, the cost for each test type over the period of time is based on the sample size, cost to test each sample, and the frequency of the test type; and
      determine an impact per portfolio over the period of time, the impact per portfolio representing an ability to reduce impact on the enterprise by identifying exceptions, the impact per portfolio is equal to a sum of impacts per test type for each test type over the period of time, the impact per test type over the period of time is based on the activity volume, the impact per exception, and an historical exception rate.

2. The system of claim 1, wherein the optimization engine is operable to generate the plurality of test portfolios by:
   receiving a maximum exception impact for each test, the maximum exception impact comprising a numerical representation of a highest tolerable exception impact for each test over a second period of time;
   defining the sample size for each test type such that the impact per test type is less than or equal to the maximum exception impact for the test corresponding to the test type; and generating the plurality of test portfolios such that each test type is characterized by the defined sample size.

3. The system of claim 2, wherein the second period of time is less than the period of time.

4. The system of claim 2, wherein receiving the maximum exception impact for each test comprises:
receiving a maximum exception rate for each test, the maximum exception rate represents a highest tolerable percentage of exceptions per activity volume; and
determining the maximum exception impact for each test from the maximum exception rate for each test.

5. The system of claim 1, wherein the test cost is a test time representing the amount of time needed to administer a portfolio over the period of time, the system further comprising a selection tool operable to:
receive a maximum test time; and
receive a selection of a portfolio with the highest impact among the plurality of portfolios and with a test time less than or equal to the maximum test time.

6. The system of claim 1, wherein each test question presents an exclusive disjunction regarding whether the enterprise's performance of the activity adheres to the internal policy.

7. The system of claim 1, wherein at least one portfolio comprises less test types than the number of the plurality of tests.

8. A non-transitory computer readable medium comprising logic for execution, the logic, when executed by a processor, operable to:
identify a plurality of tests associated with one or more policies that guide a enterprise's performance of a activity, wherein each test comprises at least one test question that assesses the enterprise's adherence to the policy;
determine an activity volume, wherein the activity volume represents a number of times the enterprise performs the activity;
determine an impact per exception, wherein an exception is an event in which the enterprise's performance of the activity fails to adhere to the policy, wherein the impact per exception is a number characterizing how one exception impacts the enterprise;
generate a plurality of test portfolios, each test portfolio comprises different types of tests of the plurality of tests, each test type characterized by a sample size and a frequency, the frequency representing a number of times the test type is to be administered during a period of time;
determine a test cost for each portfolio over the period of time, the test cost for each portfolio is equal to a sum of costs for each test type within the portfolio over the period of time, the cost for each test type over the period of time is based on the sample size, cost to test each sample, and the frequency of the test type; and
determine an impact per portfolio over the period of time, the impact per portfolio representing an ability to reduce impact on the enterprise by identifying exceptions, the impact per portfolio is equal to a sum of impacts per test type for each test type over the period of time, the impact per test type over the period of time is based on the activity volume, the impact per exception, and an historical exception rate.

9. The computer readable medium of claim 8, the logic, when executed, being further operable to generate the plurality of test portfolios by:
receiving a maximum exception impact for each test, the maximum exception impact comprising a numerical representation of a highest tolerable exception impact for each test over a second period of time;
defining the sample size for each test type such that the impact per test type is less than or equal to the maximum exception impact for the test corresponding to the test type; and
generating the plurality of test portfolios such that each test type is characterized by the defined sample size.

10. The computer readable medium of claim 9, wherein the second period of time is less than the period of time.

11. The computer readable medium of claim 9, wherein receiving the maximum exception impact for each test comprises:
receiving a maximum exception rate for each test, the maximum exception rate represents a highest tolerable percentage of exceptions per activity volume; and
determining the maximum exception impact for each test from the maximum exception rate for each test.

12. The computer readable medium of claim 8, wherein the test cost is a test time representing the amount of time needed to administer a portfolio over the period of time, the logic, when executed, being further operable to:
receive a maximum test time; and
receive a selection of a portfolio with the lowest impact among the plurality of portfolios and with a test time less than or equal to the maximum test time.

13. The computer readable medium of claim 8, wherein each test question presents an exclusive disjunction regarding whether the enterprise's performance of the activity adheres to the internal policy.

14. A method for prioritizing tests to determine compliance with policies of a enterprise, comprising:
identifying a plurality of tests associated with one or more policies that guide a enterprise's performance of a activity, wherein each test comprises at least one test question that assesses the enterprise's adherence to the policy;
determining an activity volume, wherein the activity volume represents a number of times the enterprise performs the activity;
determining an impact per exception, wherein an exception is an event in which the enterprise's performance of the activity fails to adhere to the policy, wherein the impact per exception is a number characterizing how one exception impacts the enterprise;
generating, by a processor, a plurality of test portfolios, each test portfolio comprises different types of tests of the plurality of tests, each test type characterized by a sample size and a frequency, the frequency representing a number of times the test type is to be administered during a period of time;
determining, by a processor, a test cost for each portfolio over the period of time, the test cost for each portfolio is equal to a sum of costs for each test type within the portfolio over the period of time, the cost for each test type over the period of time is based on the sample size, cost to test each sample, and the frequency of the test type; and
determining, by a processor, an impact per portfolio period of time, the impact per portfolio representing an ability to reduce impact on the enterprise by identifying exceptions, the impact per portfolio is equal to a sum of impacts per test type for each test type over the period of time, the impact per test type over the period of time is based on the activity volume, the impact per exception, and an historical exception rate.

15. The method of claim 14, wherein generating the plurality of test portfolios comprises:

receiving a maximum exception impact for each test, the maximum exception impact comprising a numerical representation of a highest tolerable exception impact for each test over a second period of time;

defining the sample size for each test type such that the impact per test type is less than or equal to the maximum exception impact for the test corresponding to the test type; and generating the plurality of test portfolios such that each test type is characterized by the defined sample size.

16. The method of claim 15, wherein the second period of time is less than the period of time.

17. The method of claim 15, wherein receiving the maximum exception impact for each test comprises:

receiving a maximum exception rate for each test, the maximum exception rate represents a highest tolerable percentage of exceptions per activity volume; and determining the maximum exception impact for each test from the maximum exception rate for each test.

18. The method of claim 14, wherein the test cost is a test time representing the amount of time needed to administer a portfolio over the period of time, the method further comprising:

receiving a maximum test time; and receiving a selection of a portfolio with the highest impact among the plurality of portfolios and with a test time less than or equal to the maximum test time.

19. The method of claim 14, wherein each test question presents an exclusive disjunction regarding whether the enterprise's performance of the activity adheres to the internal policy.

20. The method of claim 14, wherein at least one portfolio comprises less test types than the number of the plurality of tests.

* * * * *